United States Patent
Braden et al.

(10) Patent No.: US 10,052,723 B2
(45) Date of Patent: Aug. 21, 2018

(54) SYSTEMS AND METHODS FOR PERFORATING MATERIALS

(71) Applicant: ROHR, INC., Chula Vista, CA (US)

(72) Inventors: Robert L. Braden, Chula Vista, CA (US); Vijay V. Pujar, Chula Vista, CA (US); Sean Tiwari, Glendora, CA (US); Teresa Kruckenberg, La Mesa, CA (US)

(73) Assignee: Rohr Inc., Chula Vista, CA (US)

( * ) Notice: Subject to any disclaimer, the term of this patent is extended or adjusted under 35 U.S.C. 154(b) by 226 days.

(21) Appl. No.: 15/264,408

(22) Filed: Sep. 13, 2016

(65) Prior Publication Data

US 2017/0001265 A1  Jan. 5, 2017

Related U.S. Application Data

(62) Division of application No. 14/261,154, filed on Apr. 24, 2014, now Pat. No. 9,463,596.

(51) Int. Cl.
| | |
|---|---|
| *B23K 26/382* | (2014.01) |
| *B29C 59/16* | (2006.01) |
| *B23K 26/402* | (2014.01) |
| *B23K 26/70* | (2014.01) |
| *B23B 35/00* | (2006.01) |
| *B29K 105/00* | (2006.01) |

(Continued)

(52) U.S. Cl.
CPC ............ *B23K 26/382* (2015.10); *B23B 35/00* (2013.01); *B23K 26/402* (2013.01); *B23K 26/703* (2015.10); *B29C 59/16* (2013.01); *B23B 2215/04* (2013.01); *B23B 2226/27* (2013.01); *B23K 2201/34* (2013.01); *B23K 2203/172* (2015.10); *B23K 2203/50* (2015.10); *B29K 2105/251* (2013.01); *B29L 2031/737* (2013.01)

(58) Field of Classification Search
CPC .. B23K 26/703; B23K 26/382; B23K 26/402; B23K 35/00
See application file for complete search history.

(56) References Cited

U.S. PATENT DOCUMENTS

| | | |
|---|---|---|
| 4,589,190 A | 5/1986 | Anthony |
| 5,653,836 A | 8/1997 | Mnich et al. |

(Continued)

FOREIGN PATENT DOCUMENTS

| | | |
|---|---|---|
| JP | 2007281404 | 10/2007 |
| WO | 8901842 | 3/1989 |

OTHER PUBLICATIONS

Extended European Search Report dated Apr. 18, 2016 in European Application No. 15164241.0.

(Continued)

*Primary Examiner* — Daniel McNally
(74) *Attorney, Agent, or Firm* — Snell & Wilmer L.L.P.

(57) ABSTRACT

Systems and methods for manufacturing laser-perforated nanoreinforced materials are disclosed. A honeycomb core may utilize a perforated top sheet and a microperforated overlay film coupled to the perforated top sheet. The perforated top sheet and/or the microperforated film may include thermally conductive nanomaterials. The perforations in the top sheet and the microperforations in the film may be laser drilled. The nanomaterials may dissipate heat generated by the laser drilling, allowing for increased perforation speeds.

8 Claims, 4 Drawing Sheets

(51) Int. Cl.
  *B29L 31/00*  (2006.01)
  *B23K 101/34*  (2006.01)
  *B23K 103/16*  (2006.01)
  *B23K 103/00*  (2006.01)

(56) References Cited

U.S. PATENT DOCUMENTS

| | | |
|---|---|---|
| 2002/0153361 A1 | 10/2002 | Sakamoto |
| 2003/0042657 A1 | 3/2003 | Dublineau |
| 2008/0012155 A1 | 1/2008 | Raravikar |
| 2009/0268556 A1* | 10/2009 | Jiang .................. H04R 23/002 367/140 |
| 2011/0024178 A1 | 2/2011 | Chen |
| 2015/0306815 A1 | 10/2015 | Braden et al. |

OTHER PUBLICATIONS

Partial European Search Report dated Nov. 13, 2015 in European Application No. 15164241.0.
USPTO; Pre-Interview First Office Action dated Feb. 26, 2016 in U.S. Appl. No. 14/261,154.
USPTO; Notice of Allowance dated Jun. 14, 2016 in U.S. Appl. No. 14/261,154.
USPTO; Corrected Notice of Allowability dated Jun. 29, 2016 in U.S. Appl. No. 14/261,154.

* cited by examiner

SYSTEMS AND METHODS FOR PERFORATING MATERIALS

CROSS REFERENCE TO RELATED APPLICATIONS

The present application is a divisional of, and claims priority to, U.S. application Ser. No. 14/261,154 entitled "SYSTEMS AND METHODS FOR PERFORATING MATERIALS" and filed on Apr. 24, 2014, the contents of which are incorporated by reference herein in their entirety.

FIELD

The present disclosure relates to perforating fiber reinforced composite materials and polymer films.

BACKGROUND

Acoustic panels are commonly used on aircraft components to attenuate noise emissions. Such panels commonly comprise a non-perforate back sheet, a honeycomb or other shape core, and a perforated top sheet. The core forms multiple resonating chambers which are open through the perforations in the top sheet.

Acoustic panels typically have many small perforations in the top sheet. Forming these perforations can be a slow and costly process with current methods, and current methods suffer from practical limitations such as a lower limit to the diameter of the smallest practical perforation or hole. Laser drilling may be employed as an advantageous process for forming small diameter perforations for acoustic panels, which are desired to minimize drag friction, but laser drilling has drawbacks and limitations. The present invention is intended to overcome or mitigate such drawbacks or limitations with laser drilling and other drilling methods.

SUMMARY

A method of drilling holes in a composite substrate is disclosed. The method may comprise fabricating a composite substrate comprising a fiber reinforced composite ply and a surface film comprising nanoparticles disposed on the fiber reinforced composite ply. The method may further comprise drilling holes in the composite substrate.

A method of manufacturing an acoustic structure is disclosed. The method may comprise drilling a first plurality of holes in an overlay film, wherein the overlay film comprises nanoparticles. The method may further comprise drilling a second plurality of holes in a composite substrate. The method may further comprise coupling the overlay film to the composite substrate.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of various embodiments herein makes reference to the accompanying drawings, which show various embodiments by way of illustration. While these various embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

In an acoustic panel made with a fiber reinforced composite top sheet, the top sheet is not very thermally conductive. Laser drilling perforations in such a top sheet causes heat input which due to the lack of thermal conductivity may result in localized heating of the substrate to a high temperature. The need to avoid localized heating to too high a temperature, which may damage the structure of a fiber reinforced composite top sheet, presents a practical limit to how quickly the laser drilling may occur. Through experimentation, the inventors have discovered and shown that the addition of nanomaterials can effectively improve the properties of a fiber reinforced composite top sheet to better permit laser drilling and permit faster drilling rates without thermal damage. Without limiting the invention to any particular theory of causation, it is believed that improved thermal conductivity through the addition of the nanomaterials may be a potential factor in the observed improvements, but other factors are likely also playing a role.

Figure 1:
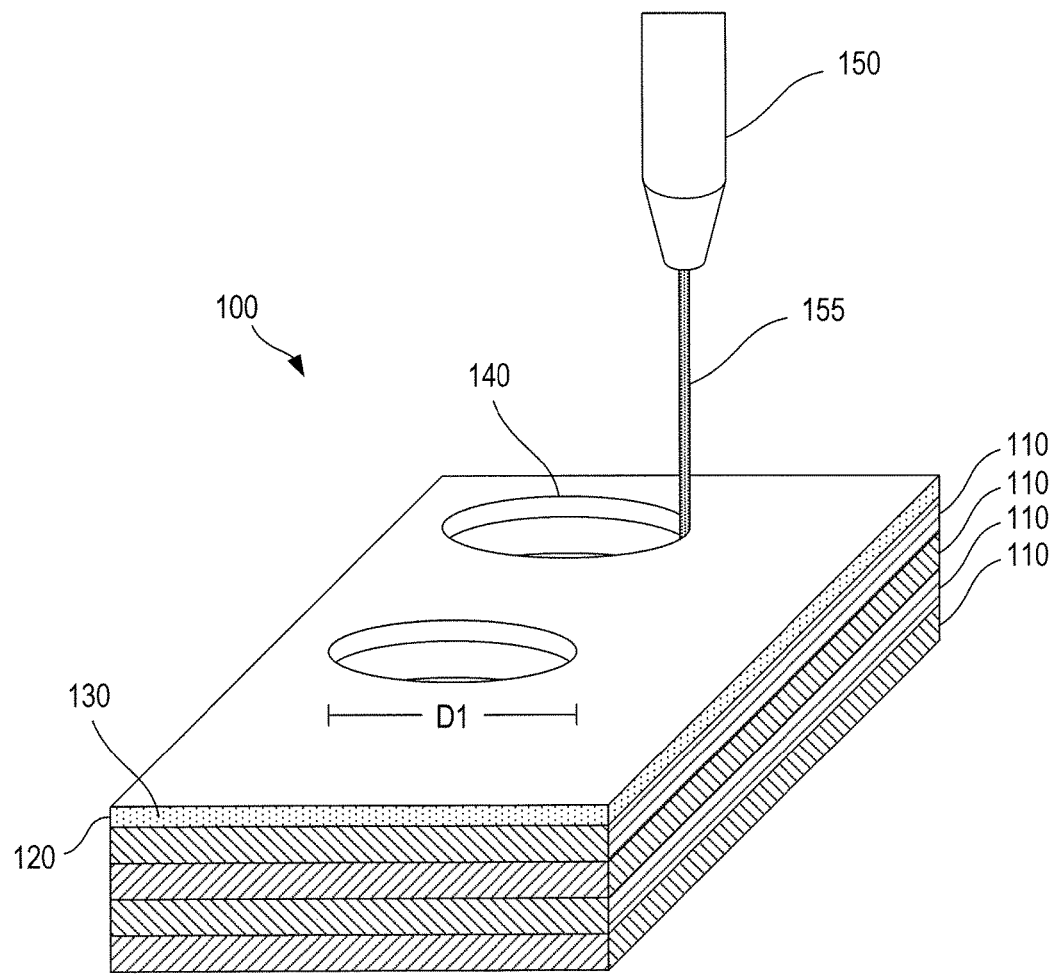
FIG. 1 illustrates a perforated top sheet for an acoustic structure in accordance with various embodiments of the disclosure.

Referring to FIG. 1, a perforated top sheet 100 is illustrated according to various embodiments. Perforated top sheet 100 may comprise a composite substrate. Perforated top sheet 100 may comprise a series of composite plies 110. Composite plies 110 may comprise a polymeric material reinforced with fibers, such as carbon fibers. Composite plies 110 may provide strength to perforated top sheet 100. Perforated top sheet 100 may further comprise a surface film 120. Surface film 120 may comprise a polymeric material. Surface film 120 may comprise a smooth finish compared to composite plies 110. Surface film 120 may thus decrease friction between perforated top sheet 100 and a fluid moving relative to perforated top sheet 100. Surface film 120 may reduce friction of air moving across surface film 120 in the context of, for example, an aircraft flying through air.

In various embodiments, at least one of composite plies 110 and/or surface film 120 may comprise nanomaterials 130. In various embodiments, the nanomaterials 130 may comprise at least one of carbon nanotubes, carbon nanofibers, and graphene nanoplatelets. The nanomaterials 130 may have a higher thermal conductivity than the polymeric material in the composite plies 110 or surface film 120. Thus, the inclusion of nanomaterials may increase the thermal conductivity of the perforated top sheet 100.

Perforations 140 may be formed in perforated top sheet 100. Perforations 140 may be added for acoustic properties, such as to allow sound waves to pass into a honeycomb core. In various embodiments, perforations 140 may have a diameter D1 of between 0.040 inches-0.060 inches (0.10 cm-0.15 cm) or between 0.020 inches-0.080 inches (0.051 cm-0.20 cm). Perforations 140 may be formed by laser drilling. Laser drill 150 may direct beam 155 at perforated top sheet 100 in order to form perforations 140. Alternatively, a plurality of laser beams may be used to form perforations 140. Laser drilling may, as a by-product, result in heat input to the top sheet 100. The greater the drilling rate, the greater the potential rate of heat input. If the heat input rate is too high, the top sheet 100 will locally heat up around the laser-drilled perforations and may cause damage.

The nanomaterials 130 present in the surface film 120 and/or composite plies 110 may increase the dissipation rate of the heat generated by the laser drilling due to the thermal conductivity of the nanomaterials 130. Thus, the rate of laser drilling may be increased without resulting in high local temperatures of the substrate or damaging the perforated top sheet 100 as compared to a perforated top sheet without nanomaterials. The faster perforation rate may dramatically decrease the costs associated with fabricating the perforated top sheet 100.

Figure 2:
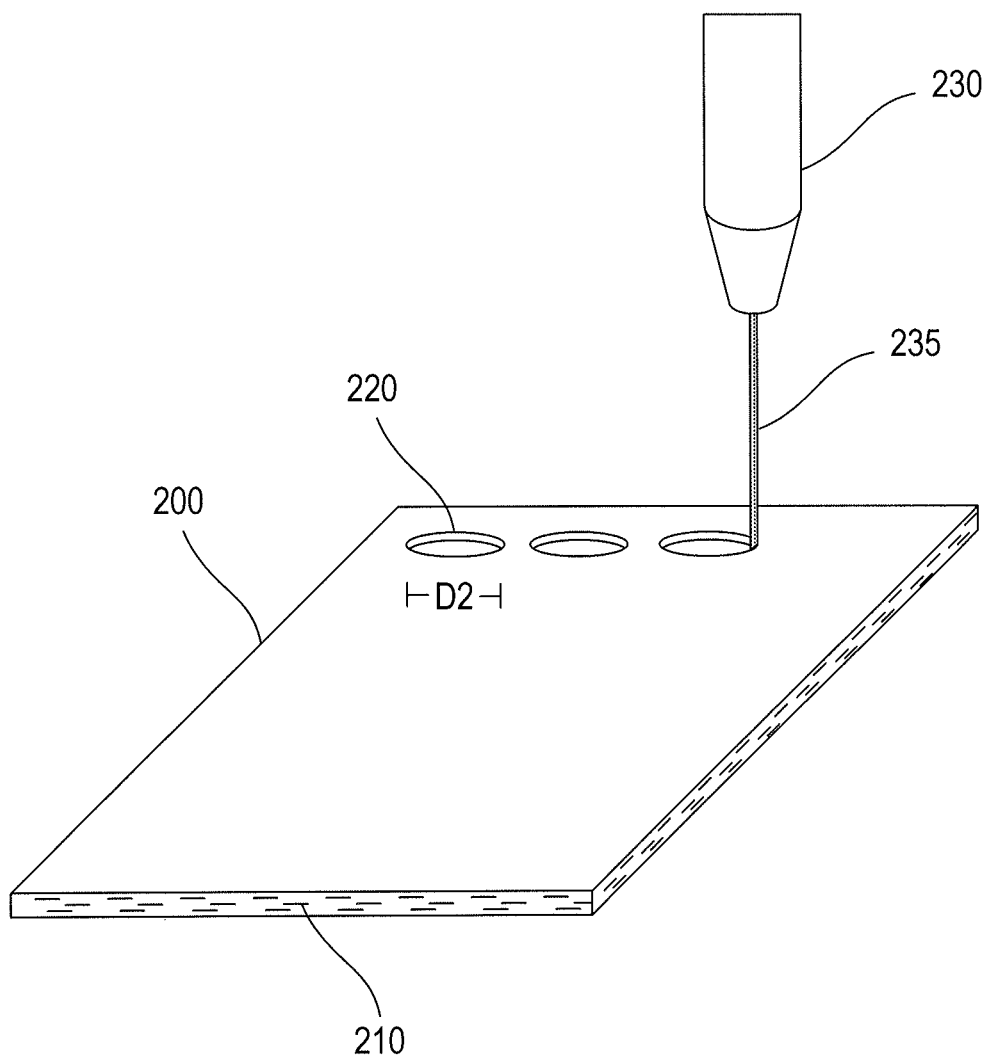
FIG. 2 illustrates a microperforated overlay for an acoustic structure in accordance with various embodiments.

Referring to FIG. 2, a microperforated film 200 is illustrated according to various embodiments. Microperforated film 200 may comprise a microperforated overlay film configured to be coupled to perforated top sheet 100 illustrated in FIG. 1. Microperforated film 200 may comprise graphene nanoplatelets 210. In various embodiments, microperforated film 200 may alternatively comprise other forms of nanomaterials such as carbon nanotubes and/or carbon nanofibers. Graphene nanoplatelets 210 may comprise short stacks of platelet-shaped graphene sheets. The graphene nanoplatelets 210 may have relatively high thermal conductivity compared to polymeric materials. In various embodiments, microperforated film 200 may comprise microperforations 220. Microperforations 220 may be added for acoustic properties, such as to allow sound waves to pass through microperforated film 200 and perforated top sheet 100 into an acoustic panel. Microperforations 220 may be smaller than perforations 140 in perforated top sheet 100, such as, for example, five times smaller than perforations 140. Microperforations 220 may be substantially circular (of course, other shapes or profiles are possible) and may have a diameter D2 of about 0.001 inches (0.0025 cm), or a diameter D2 of between 0.001 inches-0.020 inches (0.0025 cm-0.051 cm), or between 0.0005 inches-0.040 inches (0.0020 cm-0.10 cm). The smaller diameter may result in lower drag as compared to the perforations 140 in perforated top sheet 100.

In various embodiments, microperforated film 200 may further comprise an adhesive. Microperforated film 200 may be submersed in an adhesive bath in order to coat the graphene nanoplatelets 210 with the adhesive. In various embodiments, the adhesive may be a no-flow adhesive, such that the adhesive does not clog microperforations 220 during bonding of microperforated film 200 to a substrate.

In various embodiments, microperforations 220 may be formed by laser drilling. Laser drill 230 may direct beam 235 at microperforated film 200 in order to form microperforations 220. The graphene nanoplatelets 210 may increase the dissipation rate of the heat generated by the laser drilling due to the thermal conductivity of the graphene nanoplatelets 210. Thus, the perforation rate may be faster without damaging the microperforated film 200 as compared to a microperforated overlay without nanomaterials. The faster perforation rate may decrease costs associated with fabricating the microperforated film 200.

Table 1 illustrates observed results of laser drilling microperforated films with varying numbers and diameters of microperforations. In each case, the sample microperforated film was a 6 inch by 6 inch (15 cm by 15 cm) nanoreinforced adhesive film with a thickness of less than 0.001 inch (0.0025 cm). The sample films were reinforced with carbon nanotubes. The film weight is measured in grams per square meter (gsm) before perforating, and the listed film weight does not include 2 gsm of adhesive which was present in the films; the hole diameter refers to the diameter of each microperforation in inches; the array size refers to the number of microperforations (e.g. 60×60 indicates 60 rows of 60 microperforations); the POA refers to the percentage of open area, which is the area of the microperforations divided by the area of the microperforated pattern (higher POAs indicate larger and/or more closely spaced microperforations); and the time indicates the time taken to laser drill the entire microperforated pattern. Each microperforation was drilled with a 30 Watt laser using a 2 pass trepan technique, wherein the laser drill followed a circumference of each microperforation two times to remove a disk corresponding to the microperforation.

TABLE 1

| | Film Weight | Hole Diameter | Array Size | POA | Time |
| --- | --- | --- | --- | --- | --- |
| Sample 1 | 10 gsm | .020" | 60 × 60 | 21% | 8 min |
| Sample 2 | 10 gsm | .020" | 60 × 60 | 10% | 8:30 min |
| Sample 3 | 10 gsm | .005" | 100 × 100 | 1% | 22 min |
| Sample 4 | 10 gsm | .001" | 100 × 100 | 0.5% | 22 min |
| Sample 5 | 5 gsm | .020" | 60 × 60 | 21% | 8:30 min |
| Sample 6 | 5 gsm | .020" | 60 × 60 | 10% | 8:30 min |
| Sample 7 | 5 gsm | .005" | 100 × 100 | 1% | 22 min |
| Sample 8 | 5 gsm | .001" | 100 × 100 | 0.5% | 22 min |

As shown in Table 1, microperforation patterns of 60×60 holes (3600 holes) were laser drilled in eight minutes and thirty seconds or less (7.5 holes/second), and perforation patterns of 100×100 holes (10,000 holes) were drilled in twenty-two minutes (7.6 holes/second), both without heat damage to the microperforated film. A speed limitation due to heat damage was not observed in any of the samples described in Table 1. In contrast, typical times to drill a similar 60×60 laser-drilled perforation pattern without heat damage in a polymeric film without nanomaterials may be greater than sixty minutes (1.0 holes/second). Thus, the carbon nanotubes allow for increased throughput and reduced costs of manufacturing microperforated overlays.

Figure 3:
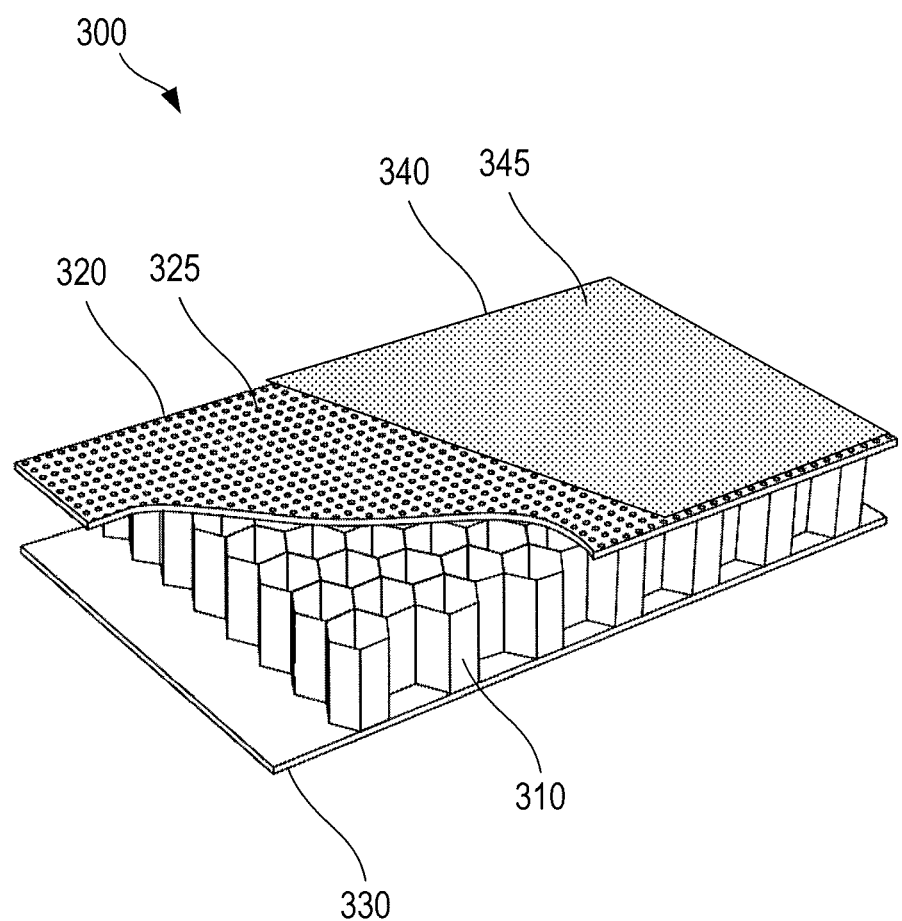
FIG. 3 illustrates an acoustic structure in accordance with various embodiments.

Referring to FIG. 3, a perspective view of a honeycomb structure 300 is illustrated according to various embodiments. The honeycomb structure 300 may comprise a plurality of cells 310, positioned between a perforated top sheet 320 and a back skin 330. The bottom of the honeycomb structure 300 may be closed by a generally rigid non-perforated plate referred to herein as the back skin 330. A perforated top sheet 320 having perforations 325 may be coupled to the top of the honeycomb structure 300. Additional layers may be formed on top of the perforated top sheet 320 for airflow and/or acoustic properties as desired. The perforated top sheet 320, cell 310, and back skin 330 combine to form a cell 310 that becomes a resonating chamber and works to damp acoustic emissions, such as sound waves from an aircraft engine. Stated another way, one function of the honeycomb structure 300 may be to attenuate sound waves, such as high frequency sound waves (for example, in the frequency range varying from 4000 Hz to 5000 Hz).

A microperforated film 340 is illustrated coupled to perforated top sheet 320 on honeycomb structure 300 according to various embodiments. Microperforated film 340 may comprise microperforations 345. In various embodiments, at least one of microperforated film 340 and perforated top sheet 320 may comprise nanoparticles. Microperforated film 340 may comprise an adhesive which may bond microperforated film 340 to perforated top sheet 320. Microperforations 345 in microperforated film 340 may cause less drag than perforations 325 in perforated top sheet 320, while still allowing for sound waves to pass into honeycomb cells 310. The POA for the combination of perforated top sheet 320 and microperforated film 340 may be calculated by multiplying the POA of perforated top sheet 320 by the POA of microperforated film 340.

In operation, acoustic treatment structures such as honeycomb structure 300 are typically incorporated in the engine inlet, nacelle and exhaust structures of an aircraft engine. For instance, airflow surfaces over elements of an aircraft, such as airflow over perforated top sheet 320, may be perforated with thousands of perforations 325 typically in the range of about 1 mm/0.040 inch in diameter. Conventionally, the perforations 325 are configured to attenuate the jet engine's noise by damping the energy response, directing the sound into the cell 310 of the honeycomb structure 300 to allow reflected noise to cancel source noise. Optionally, the cell 310 of the honeycomb structure 300 may comprise one or more septum caps configured for greater noise suppression and treatment of a wider range of attenuated frequencies.

Figure 4:
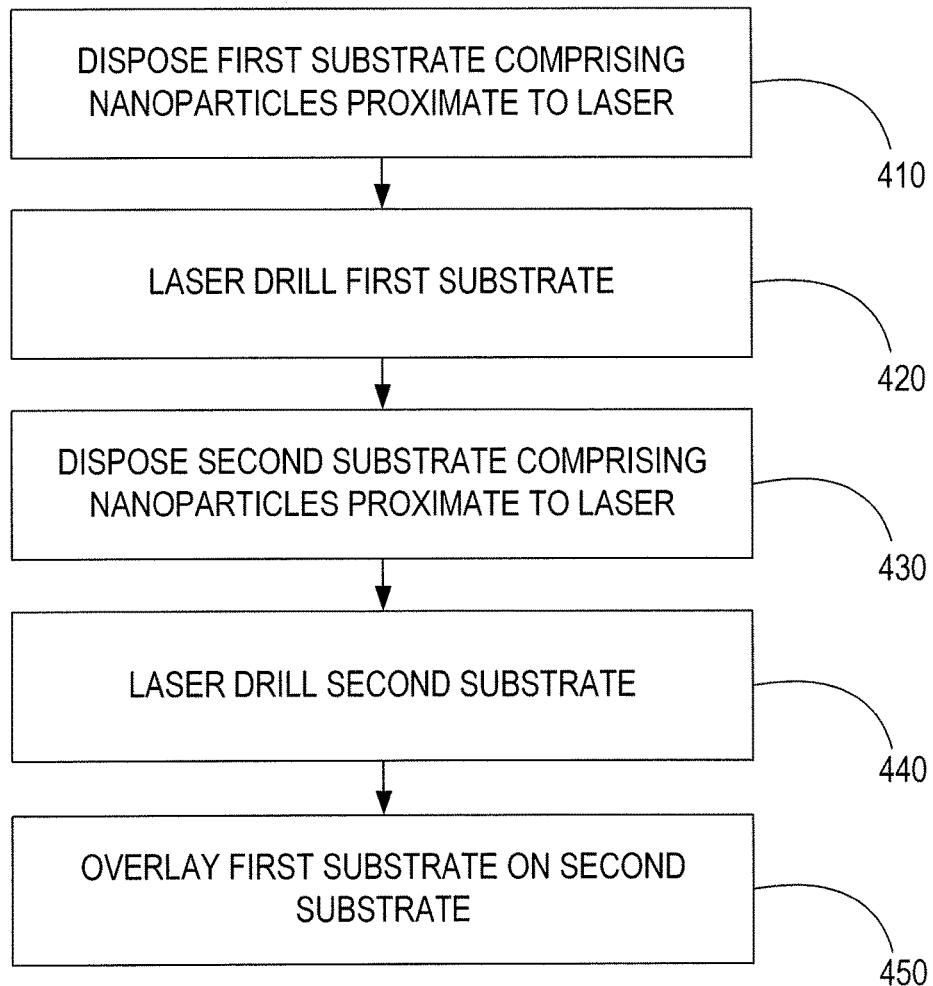
FIG. 4 illustrates a flowchart of a process for manufacturing an acoustic structure in accordance with various embodiments.

Referring to FIG. 4, a flowchart of a process 400 for forming a substrate with perforations is illustrated. A first substrate comprising nanoparticles may be provided. The first substrate may be disposed proximate to a laser (step 410). In various embodiments, the first substrate may comprise at least one of a top sheet for an acoustic structure and an overlay for an acoustic structure. In various embodiments, the first substrate may comprise a composite ply and a surface film. The surface film may be disposed on the composite ply. The nanoparticles may comprise at least one of carbon nanotubes, carbon nanofibers, and graphene nanoplatelets. In various embodiments, an adhesive may be applied to the first substrate.

A laser may drill holes in the first substrate (step 420). In various embodiments, the laser may follow a 2 pass trepan pattern in drilling the holes. In various embodiments, the laser may drill the holes at a rate of at least 2 holes per second. In various embodiments, the laser may drill the holes at a rate of at least 7.5 holes per second. In various embodiments, the holes may comprise a diameter of between 0.001 inches-0.040 inches (0.0025 cm-0.10 cm).

In various embodiments, a second substrate comprising nanoparticles may be provided. The second substrate may be disposed proximate to the laser (step 430). In various embodiments, the second substrate may comprise at least one of a top sheet for an acoustic structure and an overlay film for an acoustic structure. In various embodiments, the first substrate may comprise an overlay film, and the second substrate may comprise a top sheet. The nanoparticles may comprise at least one of carbon nanotubes, carbon nanofibers, and graphene nanoplatelets.

A laser may drill holes in the second substrate (step 440). In various embodiments, the holes in the second substrate may comprise a diameter of between 0.040 inches-0.080 inches (0.10 cm-0.20 cm). In various embodiments, the second substrate may be overlayed on the first substrate, such that the holes in the second substrate overlap the holes in the first substrate (step 450). In various embodiments, the second substrate may be bonded to the first substrate. In various embodiments, the first substrate and/or second substrate may be coupled to a honeycomb core.

Although described primarily with reference to a honeycomb structure and noise attenuation, the systems and methods described herein may be utilized in any instance where rapid laser drilling of a substrate is desired.

In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

We claim:

1. A method of manufacturing an acoustic structure comprising:
   drilling a first plurality of holes in an overlay film, wherein the overlay film comprises nanoparticles;
   drilling a second plurality of holes in a composite substrate; and
   coupling the overlay film to the composite substrate.

2. The method of claim 1, wherein the composite substrate comprises a composite ply and a surface film.

3. The method of claim 2, wherein the surface film comprises nanoparticles.

4. The method of claim 1, wherein the composite substrate comprises nanoparticles.

5. The method of claim 1, wherein a diameter of the second plurality of holes is at least five times greater than a diameter of the first plurality of holes.

6. The method of claim 1, wherein the nanoparticles comprise at least one of carbon nanotubes, carbon nanofibers, and graphene nanoplatelets.

7. The method of claim 1, wherein the coupling overlay film to the composite substrate is performed prior to the drilling the second holes.

8. The method of claim 1, wherein the first plurality of holes and the second plurality of holes are drilled with a laser.

* * * * *